SKEW CONTROL SYSTEM WITH PLURAL COMPLEMENTARY DELAY MEANS

Filed June 4, 1963 3 Sheets-Sheet 1

INVENTOR:
Wayne R. Johnson
By Smyth, Roston & Pavitt
Attorneys

June 20, 1967 W. R. JOHNSON 3,327,299

SKEW CONTROL SYSTEM WITH PLURAL COMPLEMENTARY DELAY MEANS

Filed June 4, 1963 3 Sheets-Sheet 2

INVENTOR:
Wayne R. Johnson
By Smyth, Roston & Pavitt
Attorneys

June 20, 1967 W. R. JOHNSON 3,327,299

SKEW CONTROL SYSTEM WITH PLURAL COMPLEMENTARY DELAY MEANS

Filed June 4, 1963 3 Sheets-Sheet 3

INVENTOR:
Wayne R. Johnson
By Smyth, Roston & Pavitt
Attorneys

United States Patent Office 3,327,299

Patented June 20, 1967

3,327,299

SKEW CONTROL SYSTEM WITH PLURAL COMPLEMENTARY DELAY MEANS

Wayne R. Johnson, Los Angeles, Calif., assignor to Minnesota Mining and Manufacturing Company, St. Paul, Minn., a corporation of Delaware Filed June 4, 1963, Ser. No. 285,301
8 Claims. (Cl. 340—174.1)

This invention relates to a control system for maintaining accurate phase relationships between signals which have been recorded on a number of parallel tracks on a single tape medium. The invention is applicable to any type of a tape recording system wherein multiple signals are recorded on a single tape medium in a number of parallel tracks and accurate phasing between the multiple signals is required. For example, this system may have application in telemetering systems and in the recording of television signals.

In order for a television signal to produce a clear and accurate picture the signal must occupy a band width from zero to 4 megacycles per second. A tape recording system to reproduce this band width on a single track would have to have the tape medium travel at inordinate speeds. It is therefore necessary to break the television signal into a plurality of frequency bands and record these on a multiple track tape medium with each track being parallel to the next. Each track, therefore, carries a portion of the television signal, and an accurate phase relation between the signals on each track must be maintained.

A common condition which occurs as the signals on the various tracks of the tape medium are reproduced is that the tape medium becomes skewed in relation to the tape heads. When this condition occurs, some of the signals on the various tracks lead signals on other tracks of the tape medium and the phase relationship between the various tracks is destroyed.

Large fixed misalignments of the heads relative to the tape medium may be compensated for by permanent adjustments. This type of misalignment although large is not serious since a fixed adjustment may be readily accomplished. Transient misalignments, however, are serious since there is no way to predetermine when or how they will occur. Skew due to transient misalignments may be caused by the sides of the tape medium not being parallel, or to a temporary misalignment of the feed mechanism of the tape system. The heads therefore reproduce the signals on the individual tracks with some of the signals leading others so as to destroy the original phase relationship between the signals. The result of the skew, therefore, is to have relative phase displacements in the reproduced signals.

Many methods both mechanical and electrical have been proposed to correct for these transient skew effects. Mechanical methods have not proven successful since they are slow acting and cannot compensate for the skew in the tape medium within a sufficient period of time. Electrical systems have been devised which are successful but they have proven unduly complicated and expensive. The object of this invention, therefore, is to provide a control system compensating for skew in a plural-track tape medium which is simple, accurate and provides better results than previous electrical systems.

In accordance with the broad concepts of this invention a reference signal plus an information signal are recorded on each of the tracks of the plural-track tape medium. The reference signal plus the information signal are reproduced by individual pickup heads responsive to the multiple tracks to produce a plurality of individual channels. Each channel contains the information which was previously recorded on each of the tracks of the multiple-track tape medium plus the reference signal. Each channel contains a delay line to delay the total signal a specific amount of time.

The delayed reference signal of each channel is then passed through a clipping amplifier to produce a plurality of square wave signals. One of the square wave signals is retained as a master signal. The remaining square wave signals are differentiated to produce positive and negative pulses corresponding to the leading and trailing edge of the square wave signals. The differentiated square wave signals are then applied to blocking oscillators which provide output signals having a positive and a negative pulse. The blocking oscillators are responsive only to the positive pulse of the differentiated square wave signal.

The signals from the blocking oscillators plus the one remaining square wave signal are then applied to individual switch means to produce a control signal from each switch means which is representative of the difference in phase between the square wave signal and the signal from the blocking oscillator. These control signals are fed back to the delay lines in each channel to control the characteristics of the delay lines. The phase relations of the information signals and reference signal in the various channels are therefore modified by the control signals. The information signals in each channel are, therefore, compensated by a variable delay in each line to produce output signals from the delay lines which are in the proper phase relation.

In one form of the invention all of the delay lines are variable in response to the control signals. In a second form of the invention all of the delay lines, except the one which is in the channel which produces the master square wave signal, have controllable characteristics. In the first form of the invention the delay line in the channel which produces the master square wave may have variable delay characteristics in one direction and the remaining controllable delay lines may have variable characteristics in a complementary direction. Alternatively, all the delay lines may be variable in the same direction but the control signals may be variable in opposite directions. The first form of the invention reduces the total variation required in each delay line and also increases the speed at which the control system operates to provide compensation for skew in the tape medium.

Figure 1:
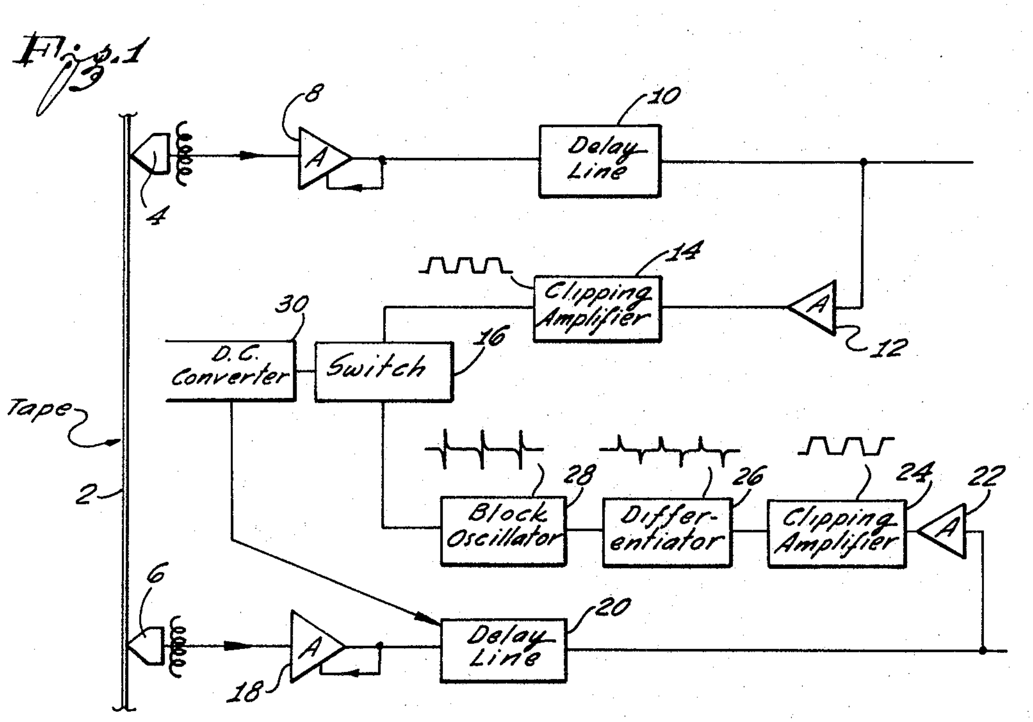
FIGURE 1 is a block diagram of a first embodiment of the invention using a smaller number of variable delay lines than the number of channels.

In FIGURE 1 a tape medium 2 has a plurality of information tracks. Two tracks are shown in the area of the pickup heads 4 and 6, but more may be provided if this is desirable. Tape head 4 picks up a first combined signal including information and a reference signal from a first track on the tape medium 2 and the combined signal is applied to an amplifier 8. Pickup 6 picks up a second combined signal including information and a reference signal from a second track on the tape medium 2. The reference signals are initially recorded in the two tracks in phase.

The amplifier 8 has a large amount of negative feedback for stabilization and for isolating the output voltage of the amplifier from the impedance of the next stage. The signals then pass to a delay line 10 which delays the signals for a predetermined period of time. An amplifier 12 is coupled to the output of the delay line 10 to be responsive to the reference signal contained in the combined signal. The reference signal then passes to a clipping amplifier 14. The reference signal may be a sine wave and the clipping amplifier 14 amplifies the sine wave and clips it to change the sine wave into a square wave signal. The square wave is applied to one side of a switch means 16.

The circuitry provided with the pickup 6 has certain similarities to the circuitry associated with the pickup 4. The signal from the pickup means 6 is a combined signal composed of information and a reference signal. The combined signal is applied to an amplifier 18 which is identical to the amplifier 8. The signal then passes through a delay line 20 which has a variable time delay. The combined signal from the delay line, which includes both the reference signal and information, is coupled to an amplifier 22. The amplifier 22 is designed to be responsive to the reference signal contained within the combined signal from the delay line 20. The signal from the amplifier 22 is then applied to a clipping amplifier 24 which is similar to clipping amplifier 14. This changes the reference signal, which may be a sine wave, to a square wave signal.

The square wave signal from the clipping amplifier 24 is applied to a differentiator 26 to change the square wave to a series of pulses having a positive pulse corresponding to the leading edge of the square wave and a negative pulse corresponding to a trailing edge of the square wave. The pulse wave from the differentiator 26 is applied to a blocking oscillator 28.

The blocking oscillator is responsive to the positive pulse from the differentiator and produces an output signal which has a positive and a negative pulse. The pulses occur one right after the other and occupy a short space of time. The pulse signal is then applied to the switch 16.

Figure 5:
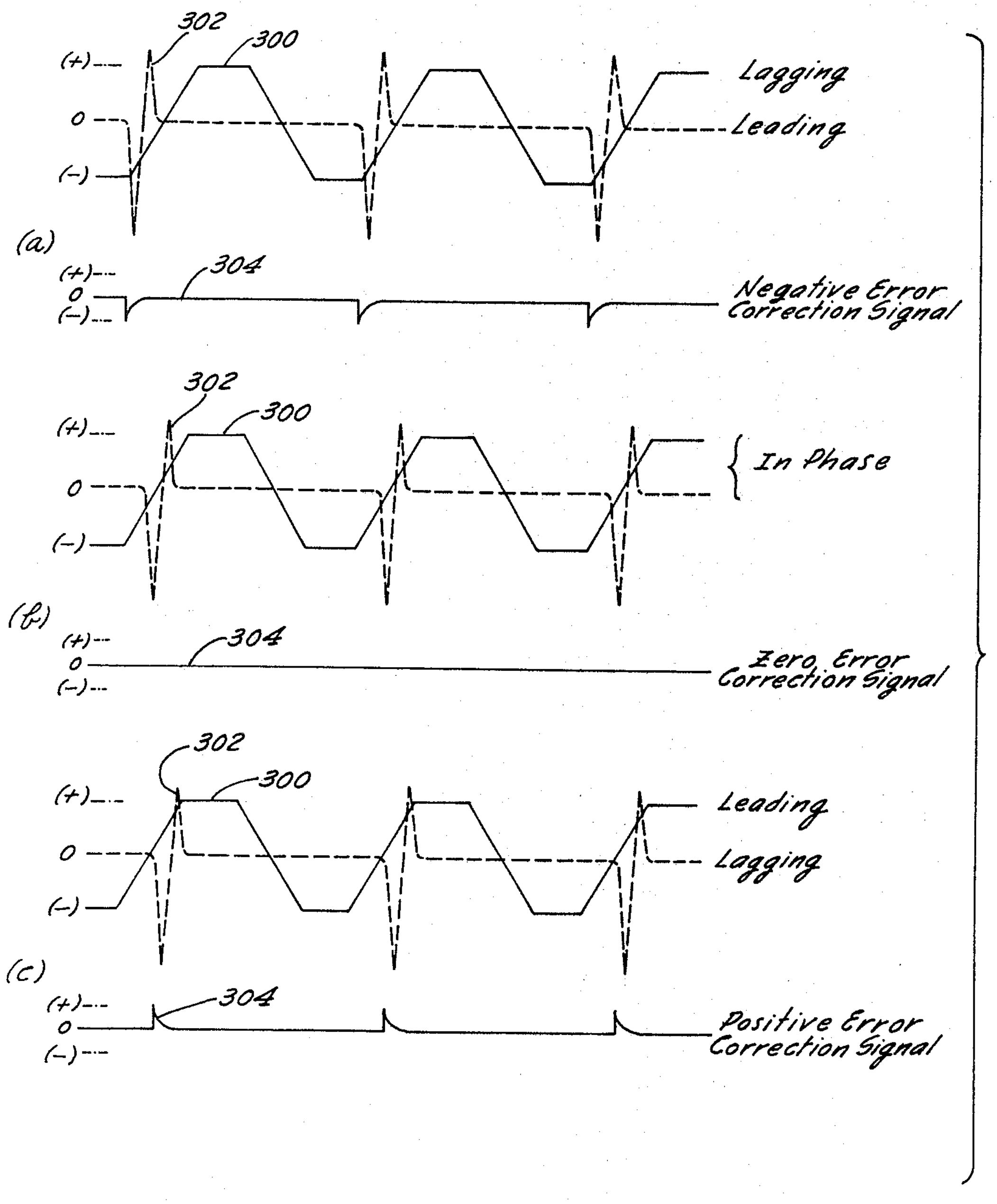
FIGURE 5 is a series of waveforms illustrating the development of a delay line control signal.

Control signals are developed from the switch 16 and are representative of the difference in phase between the square wave from clipping amplifier 14 and the pulse signals from blocking oscillator 28. A clearer understanding of the operation of the switch may be had from an examination of the waveforms shown in FIGURE 5. In FIGURE 5 the square wave is shown at 300, the signal from the blocking oscillator is shown at 302, and the error signal at 304. The negative pulse of the signal 302 controls the operation of the switch and the switch is closed to pass the signal 300 when the negative pulse is present. The error signal therefore has characteristics in accordance with the characteristics of the portion of the square wave signal passed by the switch 16.

The error signals from the switch 16 are then applied to a D.C. converter 30. The signals from the D.C. converter 30 are coupled to the delay line 20 to modify the delay characteristics in the output channel from the pickup 6 in accordance with the characteristics of the error signal. The information signals detected by the pickups 4 and 6 are, therefore, compensated for phase displacements in the information signals due to skew in the tape head arrangement or due to misalignment of the tap medium.

Figure 2:
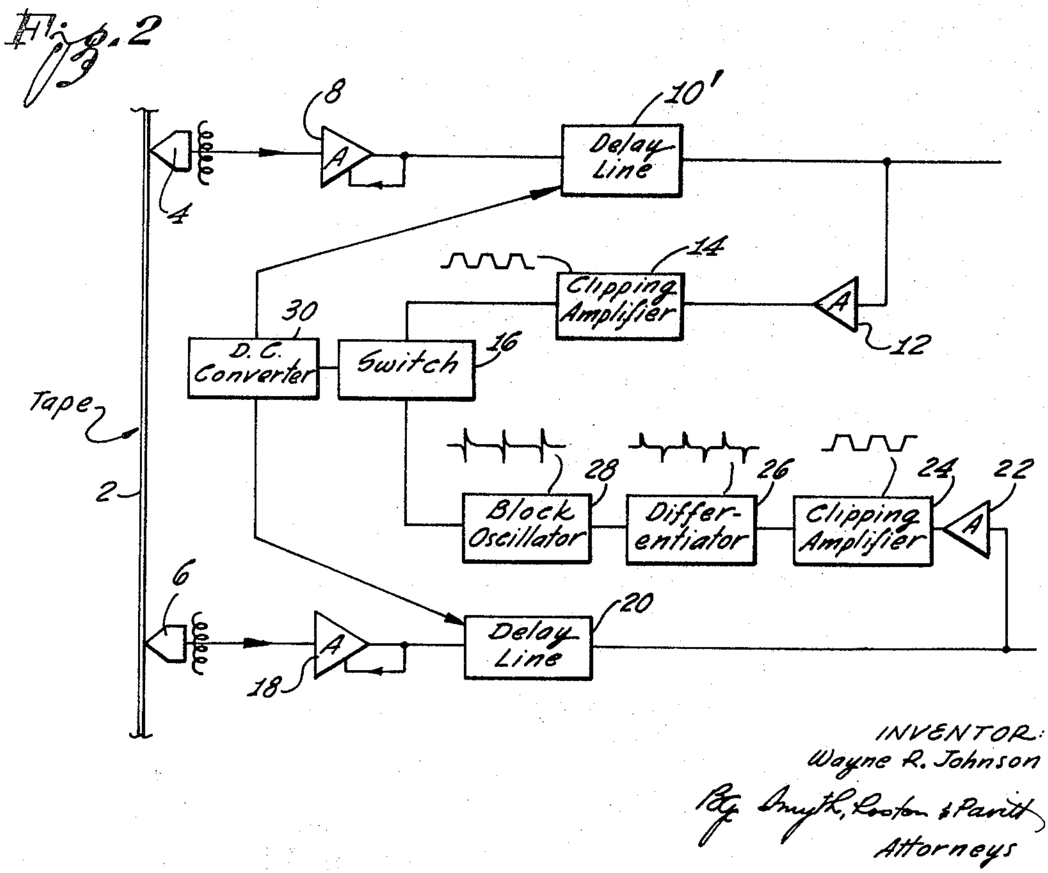
FIGURE 2 is a block diagram of a second embodiment of the invention similar to FIGURE 1 except all of the channels contain variable delay lines.

FIGURE 2 is similar to FIGURE 1 and elements which serve the same function are given the same reference characters as in FIGURE 1. FIGURE 2 additionally has a delay line 10′ which has variable delay characteristics. Delay line 10′ has a complementary relationship to the delay line 20. Control signals from the D.C. converter 30 are applied to both delay line 10′ and delay line 20. Each day line provides half the compensation to produce a result which is appreciably faster than the result from FIGURE 1. Also each delay line need only have half the variation required for the delay line 20 shown in FIGURE 1.

Figure 3:
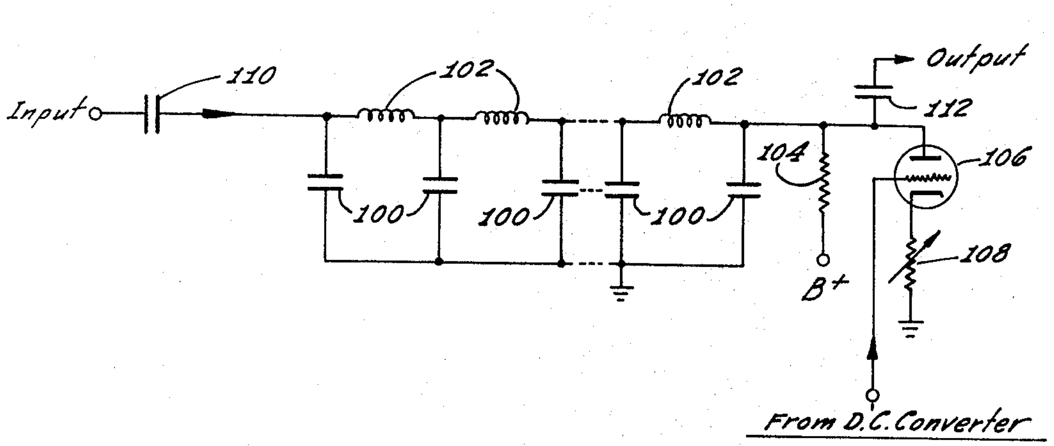
FIGURE 3 is one form of a controllable delay line which may be utilized with the systems of FIGURE 1 or FIGURE 2.

One form of a variable delay line utilizing ferroelectric capacitors 100 is shown in FIGURE 3. A decrease in the voltage across the capacitors 100 serves to increase the time delay since the capacitance of the capacitors 100 varies inversely with the voltage. Inductances 102 are connected in series. Capacitors 100 are connected between each side of the inductances to a reference potential such as ground. The value of the ferroelectric capacitors 100 varies in accordance with the bias across the capacitors. Resistance 104 couples B+ to a control tube 106 and the voltage across the resistor 104 determines the bias across the capacitors 100. The cathode of control tube 106 is connected to ground through a variable resistor 108.

The input to the delay line is through an A.C. coupling capacitor 110 and the output is taken from the plate of the control tube 106 through an output coupling capacitor 112. The delay line is controlled by bias signals from the D.C. converter applied to the grid of control tube 106. As the delay increases or decreases depending upon the bias signals, the terminal impedance to the delay line is also varied. This insures proper matching for the delay line through all values of characteristic impedance of the delay line.

If the pulse signals from blocking oscillator 28 lead the square wave signal, the control signals on the grid of control tube 106 tend to go more positive. The current through the control tube 106 increases and the voltage drop across resistor 104 also increases. This decreases the value of the capacitors 100 to decrease the delay of the variable delay line. The pulse signal and square wave signal are brought in coincidence to establish proper phase relations in the output signals from the tape system.

Figure 4:
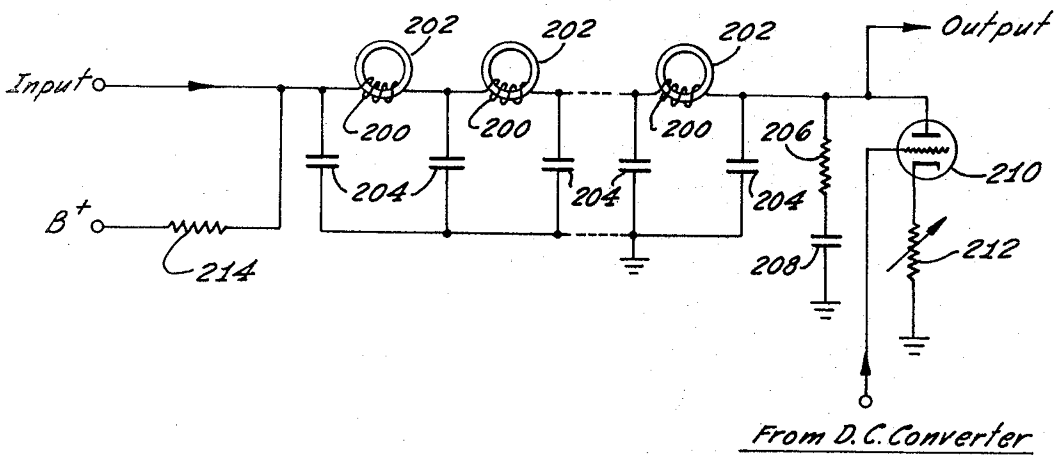
FIGURE 4 is a second form of a controllable delay line which also may be utilized with the systems of FIGURE 1 and FIGURE 2.

Another form of a controllable delay line is illustrated in FIGURE 4. The delay line consists of inductive windings 200 wound on ferromagnetic cores 202. The cores will saturate with an increase in D.C. bias current to effectively decrease the inductance of the delay line and thereby produce a decreased delay. Capacitors 204 are connected on both sides of the inductive windings 202 to ground. The delay line is terminated by a resistance 206 coupled to ground through a blocking condenser 208. The value of the resistance 206 equals the maximum characteristic impendance of the delay line.

The delay line is also terminated by a control tube 210. The cathode of the control tube is connected to ground through a variable resistor 212. The bias on the control tube 210 is controlled by control signals from the D.C. converter. The control tube serves to vary the saturation of the toroidal cores 202 and to vary the terminating resistance of the delay line to compensate for the changes in the characteristic impendance of the controllable delay line.

The input signals to the delay line contains both the reference signal and information. The delayed output signals are taken off of the plate of the control tube 210. The control tube 210 is supplied with B+ through resistance 214. The current from the B+ supply passes through the inductive windings 200 to control the saturation of the cores 202.

The control bias or error signal developed by the D.C. converter is applied to the grid of tube 210 to swing the grid positive when the pulse signal from the blocking oscillator 28 lags the square wave signal. This increases the plate current of the tube 210 which tends to saturate the cores 202 and decrease the inductance of the delay lines. The time delay of the line is therefore decreased to bring the pulse signal and square wave signal into coincidence.

As the delay line varies the characteristic impedance of the delay line also varies. Since this may cause reflections in the output signal from the delay line, the resistance of the control tube 210 varies in combination with the resistor 206 to compensate for changes in the characteristic impedance of the delay line.

When the converse situation is true and the pulse signal leads the square wave signal, the control signal from the D.C. converter tends to go negative. The plate to cathode current decreases to increase the inductance of the delay line and increase the delay. The terminating resistance also varies in the same manner as above.

The delay line of FIGURE 4, therefore, has an inverse relationship to the delay line of FIGURE 3. Either delay line may be used as part of the control system shown in FIGURE 1 as long as the polarity of the error signal is maintained in the proper relationship. In the control system of FIGURE 2 both the delay lines of FIGURES 3 and 4 are used to provide an increase in one delay line with corresponding decrease in the other delay line. This halves the variation required in each delay line and increases the speed at which the control system operates to insure a quicker response to phase displacements in the multiple tracks of the tape medium.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with a tape medium for reproducing output signals recorded on a plurality of tracks on the tape medium and with each track containing information and a reference signal and with reference signals on the plurality of tracks having a particular phase relationship, means compensating the phase of the information signals due to skew in the tape medium, including, a plurality of pick-up means operatively coupled to the plurality of tracks on the tape medium to produce multiple signal channels corresponding to the plurality of tracks on the tape medium and with each channel containing information and a reference signal, first means responsive to the reference signal included in a first one of the multiple channels to produce a square wave signal having a phase relation in accordance with the phase relation of the reference signal of the first channel, second means responsive to reference signals included in the remaining channels to produce pulse signals corresponding to each channel and with each pulse signal having a negative and a positive pulse and with the phase relationships of the pulse signals in accordance with the phase relationship of the corresponding reference signals of the remaining channels, third means operatively coupled to the first and second means and responsive to the square wave signal and the pulse signals for individually comparing each pulse signal with the square wave signal to produce control signals having characteristics in accordance with the difference in phase between the square wave signal and the control signals, and fourth means operatively coupled to the third means and responsive to the control signals for introducing a continuously variable delay in the multiple signal channels in accordance with the characteristics of the control signals to compensate for skew in the tape medium.

2. In combination for use with a multiple track tape medium having a reference signal recorded on each track and with the reference signals in phase, mean for compensating for skew in the tape medium, including, individual pick-up means operatively coupled to each track on the tape medium and responsive to the individual reference signals for producing output signals, continuously variable delay means operatively coupled to the pick-up means to produce a delay in the output signals, first means operatively coupled to the delay means for producting a square wave signal from the output signals, differentiating means operatively coupled to the first means and responsive to one of the square wave signals for producing a pulse signal having a positive and a negative pulse, second means operatively coupled to the first means and to the differentiating means and responsive to one of the square wave signals and the pulse signal to produce a control signal having characteristics in accordance with the phase relation of the square wave signal and the pulse signal, and third means for continuously varying the delay of the delay lines in accordance with the characteristics of the control signal to compensate for skew in the tape medium.

3. The combination of claim 2 wherein two of the delay lines have complementary characteristics.

4. In combination for use with a tape medium having a plurality of information channels and having a reference signal recorded simultaneously in each of the channels, a control means for correcting for skew in the tape medium, including, first means operatively coupled to the tape medium for producing output signals having phase relations in accordance with the physical position of the tape medium, second continuously variable delay means operatively coupled to the first means for delaying the output signals, third means operatively coupled to the second means for producing square wave signals having phase relations in accordance with the output signals, fourth means operatively coupled to the third means and responsive to all but one of the square wave signals to produce pulse signals having the same phase relation as the output signals, fifth means operatively coupled to the third and fourth means and responsive to the one remaining square wave signal and to the pulse signals for individually comparing the pulse signals with the square wave signal to produce a plurality of control signals having characteristics in accordance with the difference in phase between the square wave signal and each one of the pulse signals, and sixth means operatively coupled to the second and fifth means to continuously control the delay of the delay lines in accordance with the characteristics of the control signals to correct for skew in the tape medium.

5. The combination of claim 4 wherein the fourth means includes a blocking oscillator to produce pulse signals of a short duration.

6. In combination for use with a tape medium having a first and a second track and with each track containing information signals and a reference signal and with the reference signals being in phase, means for compensating for differences in phase between the signals on the first and second tracks due to inaccuracies in tape alignment during reproduction of the information signals, including, first means operatively coupled to the first track on the tape medium for reproducing the information signals and reference signal in the first track, second means operatively coupled to the second track on the tape medium for reproducing the information signals and reference signal in the second track, third means operatively coupled to the first means for introducing a fixed delay to the information signals and reference signal, fourth means operatively coupled to the second means for introducing a continuously variable delay to the information signals and reference signal, fifth means operatively coupled to the third means and responsive to the delayed reference signal for producing a square wave signal having a phase relation in accordance with the phase relation of the reference signal, sixth means operatively coupled to the fourth means and responsive to the delayed reference signal for producing a pulse signal having a phase relation in accordance to the phase relation of the reference signal, seventh means operatively coupled to the fifth and sixth means and responsive to the square wave signal and pulse signal for comparing the side of the square wave signal with the pulse signal to produce a control signal having characteristics in accordance with the difference in positions of the side of the square wave signal and the pulse signals, and eighth means operatively coupled to the fourth and seventh means and responsive to the control signal to continuously vary the delay of the fourth means to compensate for differences in phase between information signals in the first and second tracks due to inaccuracies in tape alignment.

7. The combination of claim 6 wherein the seventh means is a switch having open and closed states and wherein the pulse signal controls the operation of the switch between the open and closed states.

8. The combination of claim 6 wherein both the third and fourth means are continuously variable delay lines having complementary relationship and wherein the control signal produced by the seventh means continuously varies both delay lines.

References Cited

UNITED STATES PATENTS

| | | | |
|---|---|---|---|
| 2,877,416 | 3/1959 | Grisdale ---------- | 328—133 X |
| 3,103,000 | 9/1963 | Newman et al. ---- | 328—174.1 |

FOREIGN PATENTS

| | | |
|---|---|---|
| 809,849 | 3/1959 | Great Britain. |

BERNARD KONICK, *Primary Examiner.*

V. P. CANNEY, *Assistant Examiner.*